(12) United States Patent
Reusch (10) Patent No.: US 10,546,367 B2
(45) Date of Patent: Jan. 28, 2020

(54) DEVICE AND METHOD FOR IMPROVING MEDICAL IMAGE QUALITY

(71) Applicant: KONINKLIJKE PHILIPS N.V., Eindhoven (NL)

(72) Inventor: Tobias Reusch, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 40 days.

(21) Appl. No.: 15/566,106

(22) PCT Filed: Apr. 14, 2016

(86) PCT No.: PCT/EP2016/058196
§ 371 (c)(1),
(2) Date: Oct. 12, 2017

(87) PCT Pub. No.: WO2016/166199
PCT Pub. Date: Oct. 20, 2016

(65) Prior Publication Data
US 2018/0089807 A1 Mar. 29, 2018

(30) Foreign Application Priority Data
Apr. 14, 2015 (EP) .................................. 15163473

(51) Int. Cl.
*G06T 5/00* (2006.01)
*G06T 7/246* (2017.01)
(Continued)

(52) U.S. Cl.
CPC ............ *G06T 5/002* (2013.01); *G06T 1/0007* (2013.01); *G06T 5/50* (2013.01); *G06T 7/0012* (2013.01);
(Continued)

(58) Field of Classification Search
CPC ....... G06T 5/002; G06T 7/246; G06T 1/0007; G06T 5/50; G06T 7/0012;
(Continued)

(56) References Cited

U.S. PATENT DOCUMENTS 5,224,141 A 6/1993 Yassa
8,412,544 B2 * 4/2013 Reiner .................. G06F 19/321
705/3

(Continued)

FOREIGN PATENT DOCUMENTS

EP 1315367 A2 5/2003
EP 1550981 A2 7/2005
(Continued)

OTHER PUBLICATIONS

Kervrann, C. "PEWA: Patch-based Exponentially Weighted Aggregation for image Denoising", Advances in Neural Information Processing Systems 27, vol. 3, Jan. 2014, pp. 2150-2158.

(Continued)

*Primary Examiner* — Brandon J Miller
(74) *Attorney, Agent, or Firm* — Larry Liberchuk (57) ABSTRACT

A method of medical image processing is presented. The method proposes to apply different noise filtering algorithms to an input image, so as to yield a plurality of output images based on the same input image. The output images may be displayed at a higher frame rate than the input frame rate, which leads to a perception by a user of reduced noise in the images. Additionally, the motion fluency of the images may appear to be improved.

11 Claims, 5 Drawing Sheets

(51) Int. Cl.
*G06T 1/00* (2006.01)
*G06T 5/50* (2006.01)
*G06T 7/00* (2017.01)

(52) U.S. Cl.
CPC .... *G06T 7/246* (2017.01); *G06T 2207/10072* (2013.01); *G06T 2207/10116* (2013.01); *G06T 2207/10132* (2013.01); *G06T 2207/20182* (2013.01); *G06T 2207/20216* (2013.01)

(58) Field of Classification Search
CPC . G06T 2207/20216; G06T 2207/20182; G06T 2207/10132; G06T 2207/10116; G06T 2207/10072
See application file for complete search history.

(56) References Cited

U.S. PATENT DOCUMENTS

| | | | | |
|---|---|---|---|---|
| 9,506,882 | B2* | 11/2016 | Dasgupta | G01N 23/223 |
| 2003/0093004 | A1* | 5/2003 | Sosa | A61B 5/04 |
| | | | | 600/544 |
| 2004/0047497 | A1* | 3/2004 | Daw | G06T 19/00 |
| | | | | 382/128 |
| 2004/0131273 | A1* | 7/2004 | Johnson | G06T 5/008 |
| | | | | 382/254 |
| 2005/0135698 | A1* | 6/2005 | Yatsenko | G06T 5/002 |
| | | | | 382/260 |
| 2006/0098006 | A1 | 5/2006 | Bohm | |
| 2007/0071354 | A1* | 3/2007 | Florent | G06T 5/002 |
| | | | | 382/266 |
| 2007/0195199 | A1* | 8/2007 | Chen | H04N 5/144 |
| | | | | 348/607 |
| 2009/0167951 | A1* | 7/2009 | Chiu | H04N 5/21 |
| | | | | 348/607 |
| 2010/0019999 | A1 | 1/2010 | Vaillant | |
| 2010/0142792 | A1* | 6/2010 | Sakaguchi | A61B 6/00 |
| | | | | 382/132 |
| 2010/0199992 | A1 | 8/2010 | Ho | |
| 2011/0164799 | A1* | 7/2011 | Miao | G06T 11/006 |
| | | | | 382/131 |
| 2012/0250995 | A1* | 10/2012 | Matsumoto | G06T 5/002 |
| | | | | 382/167 |
| 2014/0321768 | A1 | 10/2014 | Tsai | |
| 2015/0371372 | A1* | 12/2015 | Athavale | G06T 5/002 |
| | | | | 382/131 |
| 2016/0014417 | A1* | 1/2016 | Benkual | H04N 19/428 |
| | | | | 375/240.26 |

FOREIGN PATENT DOCUMENTS

| | | | | |
|---|---|---|---|---|
| EP | 2615603 | A2 | 7/2013 | |
| FR | 2790562 | A1 | 9/2000 | |
| GB | 2370934 | A | * 7/2002 | ........... G11B 27/034 |

OTHER PUBLICATIONS

Lee, J.S. et al "Fusion of Coregistered Cross-Modality Images using a Temporally Alternating Display Method", Medical and Biological Engineering and Computing, vol. 38, No. 2, Mar. 2000.
Buades, A. et al "A Review of Image Denoising Algorithms, with a new One", Multiscale Model Simul., vol. 4, No. 2, 2005 Society for Industrial and Applied Mathematics, pp. 490-530.
Jago, J. et al "XRES: Adaptive Enhancement of Ultrasound Images", Medicamundi, vol. 46, No. 3, 2002.
Meuwly, Jean-Yves et al "Application of Adaptive Image Processing Technique to Real-Time Spatial Compound Ultrasound Imaging Improves Image Quality", Investigative Radiology, vol. 38, No. 5, May 2003.
Aufrichtig, Richard et al "Perceptual Comparison of Pulsed and Continuous Fluoroscopy", Medical Physics, vol. 21, No. 2, Feb. 1994.

* cited by examiner

DEVICE AND METHOD FOR IMPROVING MEDICAL IMAGE QUALITY

CROSS-REFERENCE TO PRIOR APPLICATIONS

This application is the U.S. National Phase application under 35 U.S.C. § 371 of International Application No. PCT/EP2016/058196, filed on Apr. 14, 2016, which claims the benefit of European Patent Application No. 15163473.0, filed on Apr. 14, 2015. These applications are hereby incorporated by reference herein.

FIELD OF THE INVENTION

The present invention relates to a device for medical image processing, a method for medical image processing, a medical imaging system, a computer program element, and a computer-readable medium.

BACKGROUND OF THE INVENTION

A long and complex X-ray fluoroscopy intervention can imply the application of a significant cumulative X-ray dose to a patient. Modern X-ray practice encourages the application of an X-ray dose which is as low as reasonably possible (the so-called "ALARA" principle). Therefore, a goal of medical imaging professionals is to reduce the radiation dose needed for an interventional procedure. Such dose reduction can cause an increase in noise in the resulting X-ray images. Therefore, there exists a trade-off between reducing a dose applied during an X-ray examination, and improving noise characteristics.

U.S. Pat. No. 5,224,141 discloses a system which processes static portions of a medical image using a frame-filling approach.

EP 1550981 A2 discloses a system and method for image noise reduction using a minimal error spatio-temporal recursive filter.

EP 1315367 A2 discloses a method and system for improving a color image separable into three color components.

FR 2790562 A1 discloses an optical device for mixing images and its application to the visor of a helmet.

KERVRANN C: "PEWA: Patch-based exponentially weighted aggregation for image denoising", ADVANCES IN NEURAL INFORMATION PROCESSING SYSTEMS 27, vol. 3, 1 Jan. 2014, pages 2150-2158 discloses patch-based Exponentially Weighted Aggregation for image denoising.

SUMMARY OF THE INVENTION

Therefore, it would be advantageous to have an improved technique for providing denoised medical images.

Towards this end, a first aspect of the invention provides a device for medical image processing. The device comprises an input unit and a processing unit. for processing images and an output unit for displaying the processed images in a sequence. The input unit is configured to receive an input image. The processing unit is configured to generate a first denoised image from the input image using a first noise filtering algorithm, wherein the first noise filtering algorithm is defined by a first parameter set. The processing unit is configured to generate a second denoised image from the input image using a second noise filtering algorithm, wherein the second noise filtering algorithm is defined by a second parameter set different to the first parameter set. The spatial distribution of residual noise in the first denoised image is different to a spatial distribution of residual noise in the second denoised image. The processed images are the first denoised image and the second denoised image This enables a reduction in perceived residual noise when the first denoised image and the second denoised image are presented in sequence. An output unit comprises a processor and one or more displays.

According to an example of the present invention, the first noise filtering algorithm is a spatial filter.

According to another example of the present invention, the input image is a static image and the first denoised image and the second denoised image are generated in a continuous loop.

According to another example of the present invention, the input image is comprised in an input frame sequence having an input frame rate; the processing unit is further configured to generate an output frame sequence having an output frame rate; and the output frame sequence comprises the first denoised image and the second denoised image.

According to another example of the present invention, the first and/or second parameter sets comprise parameters defining a filter kernel in a spatial domain and/or in a frequency domain.

According to another example of the present invention, the second noise filtering algorithm is a temporal filter applied to the input frame sequence.

According to another example of the present invention, the second parameter set further comprises parameters defining an temporal filter selected from the group of: filter bandwidth, entropy, geometrical feature translation between subsequent or past frames, and/or a temporal decay parameter between subsequent or past frames.

According to another example of the present invention, an order of displaying at least the first and the second denoised image after application of at least the first and the second denoising algorithms to a first image in the input image sequence is different from the order of displaying at least the first and the second denoised image after application of at least the first and second denoising algorithms to a second image in the input image sequence. The term order is be understood as order in time.

According to another example of the present invention, the input unit is further configured to provide a medical image archive comprising medical images and to use as the received input image an image from the medical image archive, and wherein the processing unit is further configured to generate a post-processed medical image archive comprising the first denoised image and the second denoised image.

According to a second aspect of the invention, there is provided a method for medical image processing. The method comprises the following steps:

a) receiving an input image;
b) generating a first denoised image from the input image using a first noise filtering algorithm, wherein the first noise filtering algorithm is defined by a first parameter set;
c1) generating a second denoised image from the input image using a second noise filtering algorithm, wherein the second noise filtering algorithm is defined by a second parameter set different to the first parameter set; and wherein a spatial distribution of residual noise in the first denoised image is different to a spatial distribution of residual noise in the second denoised image
c2) displaying the first denoised image and the second denoised image in a sequence, thereby enabling a reduction in perceived residual noise when the first denoised image and the second denoised image are presented in sequence.

According to another example of the present invention, the input image is comprised in an input frame sequence having an input frame rate; and further comprising the step of:

d) generating an output frame sequence having an output frame rate;

wherein the output frame sequence comprises the first denoised image and the second denoised image.

According to another example of the present invention, the method comprises the steps of:

a1) providing a medical image archive comprising medical images;

a2) using as the received input image an image from the medical image archive; and e) generating a post-processed medical image archive comprising the first denoised image and the second denoised image.

According to a third aspect of the invention, a medical imaging system is provided. The medical imaging system comprises:

a medical imaging acquisition arrangement, and
a device for medical image processing.

The device for medical image processing is provided as a device as described above.

According to a fourth aspect of the invention, there is provided a computer program element for controlling a device for medical image processing as described previously, which, when being executed by a processing unit, is adapted to perform the method steps as described previously.

According to a fifth aspect of the invention, there is provided a computer-readable medium having stored the program element described above.

The generation of a first denoised image and a second denoised image using a first noise filtering algorithm and a second, different, noise filtering algorithm enables an improvement in the perceived residual noise when the first denoised image and the second denoised image are presented in sequence. This means sequentially in time.

This is because the first denoised image and the second denoised image can be presented to the user at a higher rate compared to the time taken to present a single image, because there are at least two output images generated for each input image. The implied decrease in image display time causes the human visual system effectively to average the at least two denoised images, resulting in a final image which appears, to the human user, to contain less noise than the original image.

Such an averaging in noise allows the X-ray exposure in a system according to the aspects of the invention to be reduced. The implied increase in noise caused by the reduction of the X-ray dose may be perceived by a user to be reduced owing to the increased display rate. Therefore, an X-ray dose applied to a patient can be reduced.

In addition, it is the case that for each input image, at least two output images are generated. The implied increase in output frame rate with respect to the input frame rate means that denoised sequences appear to a user to have a more fluent, or less a jerky action.

In this specification, the term "noise filtering algorithm" means a mathematical function which, when applied to an input image, reduces the power attributable to a noise component of an image, relative to the power attributable to non-noise components of the image. A wide variety of noise filtering algorithms is known, such as spatial noise reduction algorithms operating on a single image frame. These identify areas of an image frame with a relatively high noise variance, and average these areas. Alternatively, the noise filtering algorithm applied to a frame is a temporal filter. In other words, an area of a "current frame" is compared to the same area, or a translated area, in a "previous frame" or a "subsequent frame". Areas in the "present frame" which remain the same as previous and or subsequent frames are averaged. From this general description it is clear that many noise filtering algorithms could be used.

In this specification, the term "parameter set" refers to at least one configuration parameter of a noise filtering (smoothing) algorithm necessary to define that algorithm. In the case of a spatial filter, this could define the filter transfer function of a noise-cancelling spatial low-pass filter, defining the filter characteristic (for example a median, or a linear Gaussian filter). The parameter could comprise transfer function coefficients, and attenuations at specific frequencies. The parameter set may encompass not just formal filter parameters, but practical parameters such as the size of a bounding-box used to determine an image averaging area as used in a spatial or temporal filter. A noise variance parameter or an edge detection parameter can be used to trigger filtering. Likewise, temporal filters can be defined at least by parameter sets involving a degree of feedback and/or feedforward to be applied, for example. Thus, it will be seen that the term "parameter set" encompasses a wide range of parameter types.

In this specification, the term "spatial distribution of residual noise" means the location of pixels modified by the action of noise in an image. A copy of an image having a first noise distribution will have the same noise distribution, of course. If a noise filtering (smoothing) algorithm is applied to the copy of the image, then the noise components of a given pixel caused by the action of noise in the image will change as a result of the action of the algorithm on the image.

In this specification, the term "perceived residual noise" means that a human observer experiences a reduction in noise when observing an image sequence of the same image, but with different noise distributions for different images. This perceived reduction in noise is a result of the action of the human visual system, which subconsciously smoothes the noise between several quickly moving patterns of noise.

In other words, this invention exploits the temporal properties of the human visual system leading to a decrease in perceived noise in respect to an original frame rate, or a more general improved noise appearance. The averaging capabilities of the human visual system are exploited to perform the averaging. This leads to an improvement in the perception of the frame's image quality. It is also observed that a processed image sequence may appear to be more fluent, owing to the upsampling effect of the algorithm. This can be exploited by reducing the radiation dose per pulse such that the perceived noise equals the perceived noise without non-deterministic processing, the perceived image noise can be improved without increasing X-ray dose, and an improved perceived frame rate will decrease the burden of using a low frame rate acquisition protocol, which helps to reduce significantly the X-ray integral dose experienced by a patient.

These and other aspects of the invention will become apparent from, and are elucidated, with reference to the embodiments described hereinafter.

BRIEF DESCRIPTION OF THE DRAWINGS

Exemplary embodiments of the invention will be described with reference to the following drawings.

DETAILED DESCRIPTION OF EMBODIMENTS

In the case of fluoroscopy or interventional radiology procedures, a significant reduction of the applied X-ray dose can be achieved by lowering the acquisition frame rate, and therefore by reducing the number of exposures taken during the intervention. Alternatively, the X-ray dose may be reduced. A reduction of primary X-ray dose leads to an increased noise level in the obtained image sequence. A reduction in acquisition frame rate leads to an acquired sequence appearing to a user to lack fluency. Thus, a reduction of X-ray exposure is limited by the requirements of image quality. For example, low contrast objects might not be visible if the image noise is too high. Lowering the frame rate of standard fluoroscopic acquisition protocols could lead to image sequences which are less fluent. This effect might hinder the usage of low frame rate protocols. A trade-off between patient radiation dose (as determined by the X-ray power and/or the acquisition frame rate) has to be found. This should generally follow the ALARA (as low as reasonably achievable) principle.

Although aspects of this invention are concerned with the denoising of X-ray images, it may usefully be applied to other types of imaging, for example ultrasound or MRI imaging. In this case, a goal is to lower the general noise level of a measured image or image sequence.

Spatial filters identify and smooth patches within an image which do not carry significant information, but only noise. An area containing significant information is an area of the image containing information useful to a medical professional, such as a guidewire, or an organ or bone boundary. The filtering of such objects in an image could cause them to be reduced in spatial resolution, which would be disadvantageous to the medical professional. To avoid such a reduction in spatial resolution, a spatial filtering algorithm identifies patches within an image that do not carry significant information, and then filters these areas.

Figure 1A:
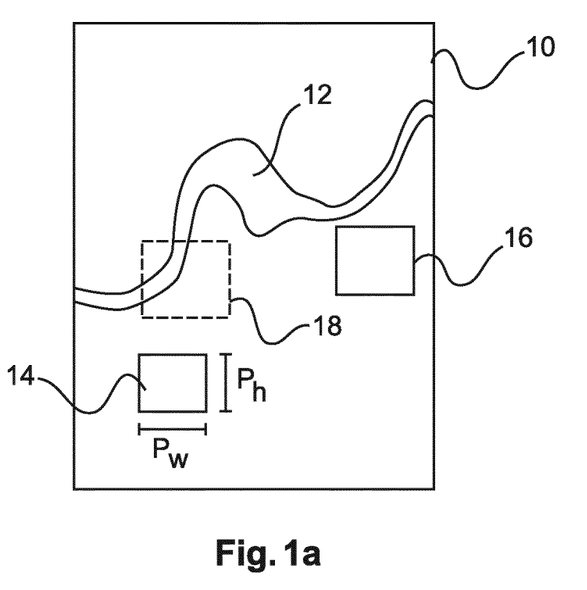
FIG. 1a illustrates an example of a spatial noise filtering algorithm.

FIG. 1a) illustrates an example fluoroscopy frame 10 which comprises an image of a blood vessel 12. A first bounding box is shown at location 14 having a pixel height $p_h$ and a pixel width $p_w$. A second bounding box location is shown at 16, and a third pixel bounding box location is shown in location 18. A spatial filtering algorithm could identify as candidates for smoothing locations 14 and 16, because these do not contain significant information, but only noise-containing background image objects. On the other hand, location 18 would not be a good candidate for spatial filtering, because if this area was spatially filtered, the contrast of the boundaries of the target blood vessel would be reduced, leading to a loss of spatial resolution.

Temporal filters can also be applied to image sequences obtained at an input frame rate. This is because certain areas of subsequent and past frames will not change significantly, compared to those areas in a present frame, for a limited number of images within the sequence.

Figure 1B:
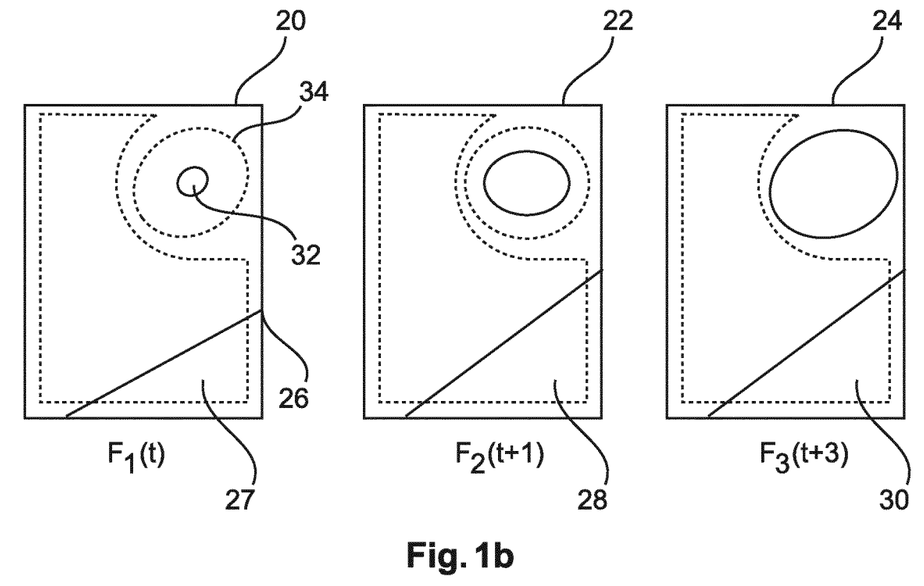
FIG. 1b illustrates an example of temporal noise filtering algorithm.

FIG. 1b) illustrates a schematic of a sequence of three frames taken from a fluoroscopy of a chest, to which a temporal filtering algorithm is then applied. Frames 20, 22 and 24 each comprise sequential frames of a rapidly moving object such as a heart, and a slowly moving object, such as a diaphragm. The diaphragm is illustrated as a diagonal line 26. A heart 32 is shown in frame 20 in a contracted state. A dotted line 34 around it illustrates the maximum extent of the heart's expansion. Therefore, in frame 22, the heart is shown as half-expanded, and in frame 24 the heart is shown in its fully expanded state.

Thus, there is a region in each of the three frames corresponding to the region where the heart is located in which, for previous and subsequent frames, compared to a current frame $F_2(t+1)$, the extent of the heart containing region will change. The frames also contain areas which do not change significantly in a previous frame $F_1(t)$ 27 or a subsequent frame $F_3(t+2)$ 30. In this exemplary temporal filtering algorithm, areas 27, 28 and 30 are averaged with each other, but the area containing the heart is not averaged. This reduces the effect of motion blur between frames. The areas to filter, and to not filter, in each frame can be identified using image recognition techniques known to the person skilled in the art, such as edge detection.

Therefore, spatial filters and temporal filters, when applied to sequences of medical images, must be carefully parameterized in order to limit any associated loss of spatial resolution to interesting regions within an image. In the case of spatial filtering, an incorrect choice will reduce the spatial resolution of small or low-contrast objects. For the example of temporal averaging, an incorrect parameter choice will cause an increase in motion blur.

If the strength of the denoising algorithm is increased beyond reasonable limits, the overall spatial resolution of the entire image will be compromised. Consequently, residual noise will generally be present in denoised images. The strength of the residual noise depends at least on the applied X-ray dose—generally, the residual noise of an image acquired at a low X-ray dose will be larger than the residual noise in an image acquired at a high X-ray dose.

Certain image processing techniques which could improve the overall image quality are hindered by the amplification of noise. Deconvolution operations suffer from this problem. Improved denoising techniques therefore also help to improve the sharpness of image sequences.

Figure 2:
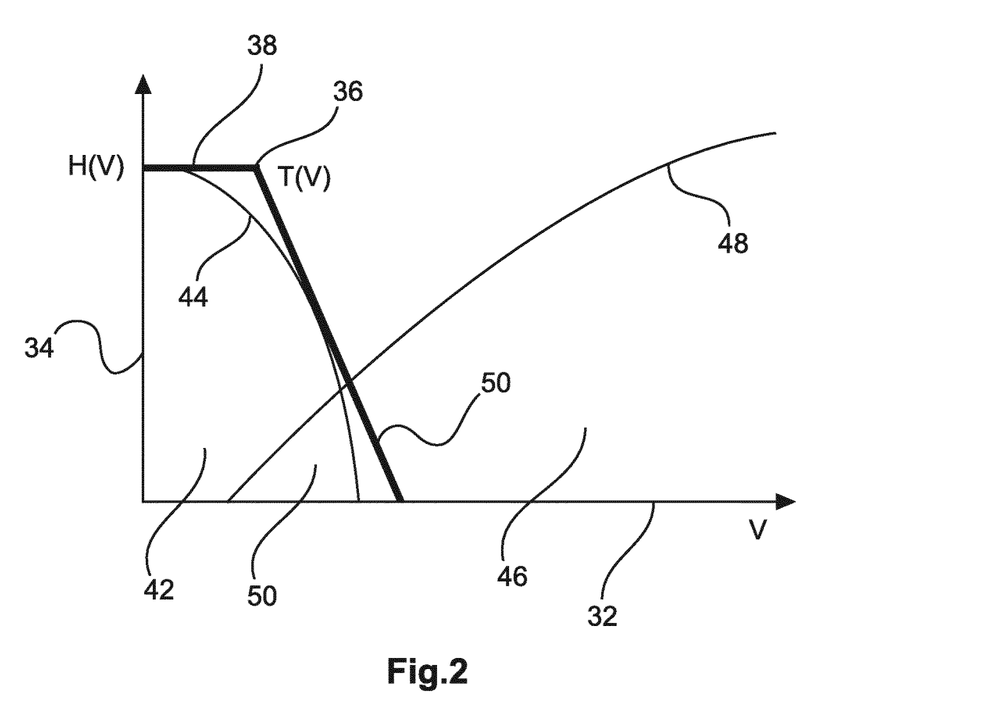
FIG. 2 illustrates a filter characteristic.

FIG. 2 illustrates a general characteristic of a filter. The information content in a small region of interest (ROI) is quantified by an arbitrary variable V on axis 32. This can be measured across any mathematical domain, such as the spatial domain or the frequency domain. A histogram H(V) is plotted against axis 34 for an arbitrary image. Region 42 under curve 44 defines an area containing noise power. Region 46 under curve 48 defines a region containing image information.

In this situation, low frequency noise must be removed from an image. Denoising is performed by applying a filter kernel having a transfer function that defines a strength that is determined by the threshold of curve T(V). Typically, the attenuation of H(V) at a given point on V is defined in decibels (dB). For the example shown, when the arbitrary variable V is frequency, the threshold T(V) defines a low-pass filter in the frequency domain with a region of constant attenuation 38 and a slope cut-off characteristic 40. An area of overlap 50 represents a region which contains image information which will be filtered by the low-pass filter in order to remove noise, although some useful information will also be lost from the image.

The filter characteristic T(V) illustrated in FIG. 2 may be adjusted, for example over time, or space, or frequency, to suit changes in the noise characteristics, or to reflect the movement of objects in the image, for example. Therefore, the filter may be an adaptive filter, such as an adaptive spatial filter, or an adaptive temporal filter.

Figure 3:
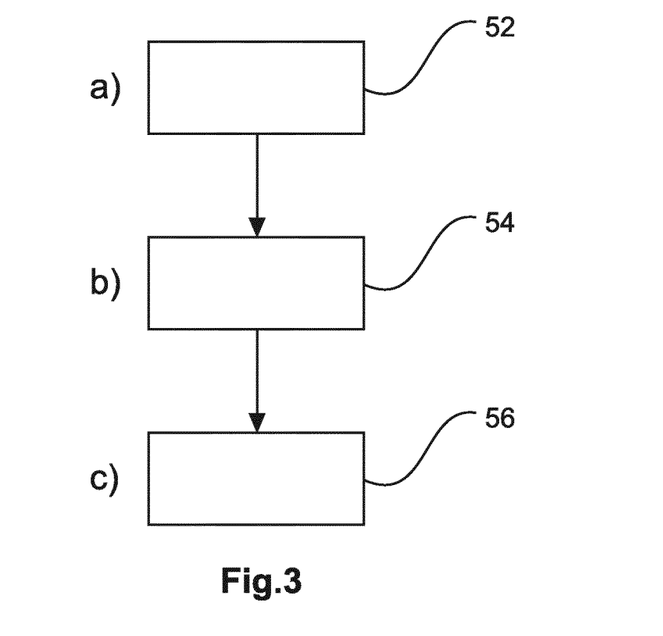
FIG. 3 illustrates a method for medical image processing according to a second aspect of the invention.

According to an aspect of the invention, there is provided a method for medical image processing. The method comprises the following steps:

a) receiving 52 an input image;
b) generating 54 a first denoised image from the input image using a first noise filtering algorithm, wherein the first noise filtering algorithm is defined by a first parameter set;
c1) generating 56 a second denoised image from the input image using a second noise filtering algorithm, wherein the second noise filtering algorithm is defined by a second parameter set different to the first parameter set; and wherein a spatial distribution of residual noise in the first denoised image is different to a spatial distribution of residual noise in the second denoised image
c2) displaying the first denoised image and the second denoised image in a sequence, thereby enabling a reduction in perceived residual noise when the first denoised image and the second denoised image are presented in sequence.

FIG. 3 illustrates the method according to an aspect of the invention. Step c) may comprise substeps e.g. c1) and c2).

Figure 4:
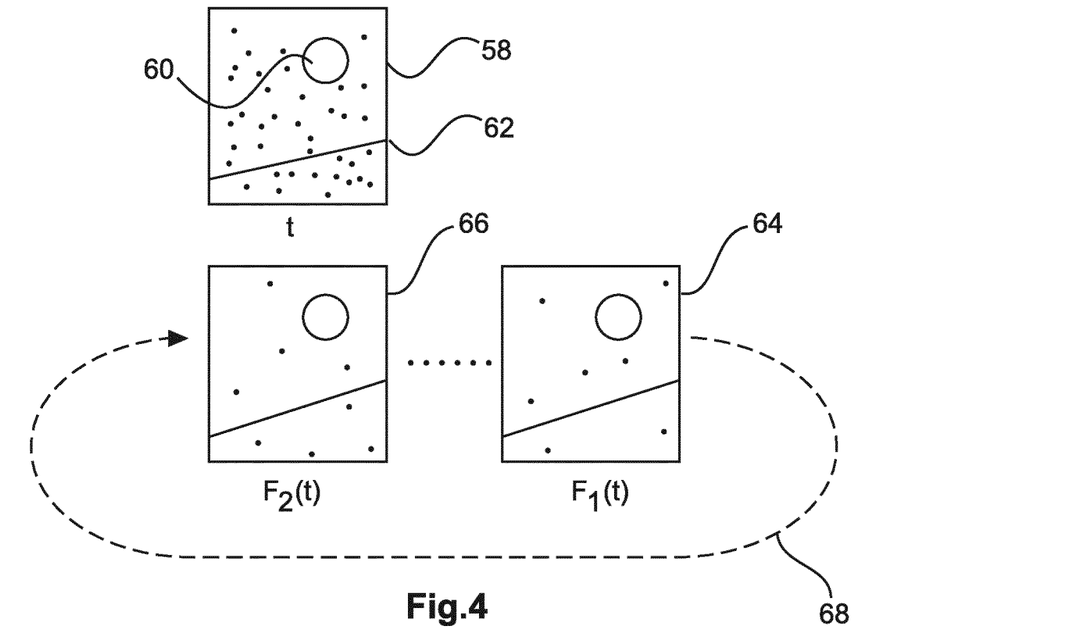
FIG. 4 illustrates an example of a method for medical image processing in operation.

FIG. 4 illustrates the operation of the method in a typical algorithm. Frame 58 contains a moving object, such as a heart 60, and an object which moves much more slowly compared to the heart, such as a diaphragm or rib boundary 62. The frame 58 is affected by speckle noise which is shown as a speckle pattern in the frame body.

The algorithm is applied as previously described. This results in a frame 64 which is the first denoised image, and a frame 66 which is a second denoised image. The first denoised image is generated by applying a first noise filtering algorithm $F_1(t)$ to the input image, i.e. the frame 58. It is seen that the first denoised image has a reduced speckle pattern compared to the input frame 58. The second denoised image is generated by applying a second noise filtering algorithm $F_2(t)$ to the input frame 58. It is seen that the second denoised image also has a reduced speckle pattern compared to the input image 58. In addition, the speckle pattern of residual noise in the second denoised image is different to the speckle pattern in the first denoised image.

Therefore, an improvement in perceived noise performance results, allowing a reduction in an applied X-ray dose, or a reduction in an acquisition rate of the input image, if it is captured in a sequence.

In the algorithm as discussed, at least a second noise filtering algorithm is defined by a second parameter set different to a first parameter set. This difference may be (1) in at least one different parameter value, and/or (2) in at least one different type of parameter. Thus, the first noise filtering algorithm and the second noise filtering algorithm may be temporal spatial filters having the same type of parameter. However, the values of these parameters may be different; for example, the first noise filtering algorithm may define a low-pass filter having a cut-off frequency different to a low-pass filter defined by the second noise filtering algorithm.

According to another example, the first noise filtering algorithm and the second noise filtering algorithm may be adaptive temporal algorithms. The first noise filtering algorithm may be defined by a historical frame weighting parameter which averages the immediately previous frame with 70 percent weighting, the second to immediately previous frame with 50 percent weighting, and so on, obtaining a historical decay characteristic for the first noise filtering algorithm. The second noise filtering algorithm may also be a temporal filter, but it instead would be defined by different type of parameter, for example the second noise filtering algorithm may be defined by a feed-forward parameter.

The design of the noise filtering algorithms used according to aspects of the invention are designed such that the residual image noise is an uncorrelated as possible. The parameters are designed accordingly, based on the constraints of the modality, the region of the body which is imaged, or on the acquisition protocol, for example.

It will be understood by the person skilled in the art that the order of application of the first noise filtering algorithm and the second noise filtering algorithm is not fixed, and indeed the second noise filtering algorithm may be applied first.

According to an embodiment of the invention, the noise filtering algorithm is an adaptive spatial filter.

An adaptive spatial filter is applied to regions in the input image carrying predominantly noise. Therefore, the spatial resolution of edges of important features is not compromised.

According to an embodiment of the invention, noisy regions may be identified by using sampling boxes in regions of the images, and measuring, for example, the standard deviation, entropy, or range in pixel intensity inside the boxes, and comparing the result to the same result from other boxes.

According to an embodiment of the invention, a method is provided as described previously, wherein in step a), the input image is a static image, and wherein the first denoised image and the second denoised image are generated in a continuous loop.

FIG. 4 also illustrates this optional embodiment, because the continuous loop is denoted using dotted line 68.

Static images, such as a "last image hold", or a diagnostic X-ray image, comprise a single image which may be noisy. According to this embodiment, the image is denoised repeatedly in an infinite loop. The human visual system thus improves the perceived image quality of the static image by displaying copies of the image with different noise characteristics, at an upsampled rate.

According to an embodiment of the invention, averaging is performed without increasing the frame rate of the image display. This reduces the uncorrelated part of the residual noise, but does not increase the frame rate. This embodiment of the invention is applicable to static images.

According to an embodiment of the invention, a method is provided as described previously, wherein the input image is comprised in an input frame sequence having an input frame rate, and further comprising the step:

d) generating an output frame sequence comprising the first and second denoised images having an output frame rate which is higher than the input frame rate.

The output frame rate is higher than the input frame rate, and therefore the temporal averaging properties of the human visual system allow a decrease in the perceived noise with respect to the original frame rate. This is called the Aufrichtig effect.

Figure 5:
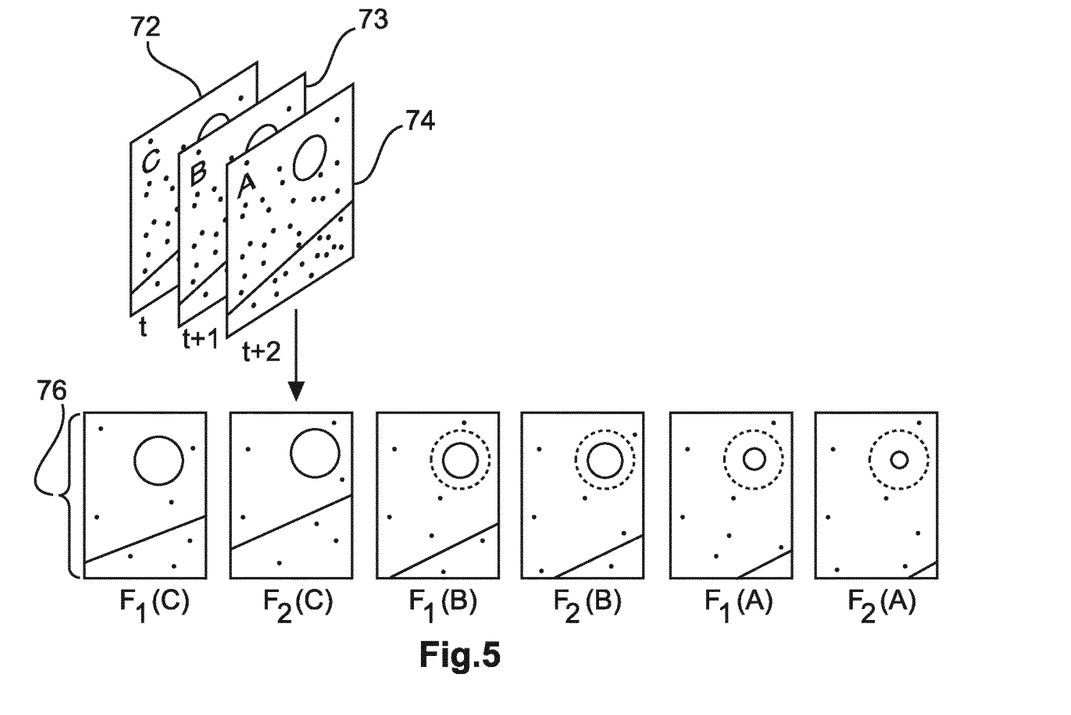
FIG. 5 illustrates another example of a method for medical image processing in operation.

FIG. 5 illustrates this embodiment of the invention. A sequence of input frames 72, 73, 74 is provided at an input frame rate.

Each image in the sequence is processed multiple times by processing (denoising) algorithms. Therefore, a plurality of processed images is provided at an upsampled frame rate which is a multiple of the number of parallel filter processing stages applied.

The image processing (denoising) algorithm applied to each frame is modified such that multiple noise reduction algorithms, each based on a different set of parameters, is applied for each of the plurality of input images. The exact spatial distribution of residual noise in the processed images will vary as the algorithm is applied to exactly the same image frame in a sequence, several times. This has the effect of changing the spatial distribution of residual noise, which makes the residual noise in each image more uncorrelated, with respect to the noise in other images. A number of different parameter sets, equal to the number of iterations of the algorithm, are provided such that the overall performance of the algorithm is not compromised, and residual noise is as uncorrelated as possible. The output frame rate is a multiple of the input frame rate, determined by the number of filter stages applied.

FIG. 5 illustrates that the input sequence 72, 73, 74 is processed by the algorithm comprising two different noise filtering algorithms. Therefore, a denoised output image sequence 76 comprises six frames with uncorrelated residual noise speckle patterns. The output frame sequence is output at twice the rate of the input frame sequence in the case illustrated.

The parameters used to define the first noise filtering algorithm and the second noise filtering algorithm are chosen on the basis of the type of noise filtering algorithm employed. The parameters may also be designed to take into account conditions present during a specific acquisition method, or surgical procedure. Therefore, in the case of a spatial noise filtering algorithm, the parameters that may be varied include the boundary box size, the entropy or standard deviation detected inside the bounding box, arbitrary bounding region shapes (because the noise filtering spatial area need not be a rectangle), and many other parameters will occur to the skilled person.

In the same way, the second parameter set may also contain a wide range of parameters relevant to the second noise filtering algorithm.

According to an embodiment of the invention, the second noise filtering algorithm is an adaptive temporal filter.

According to an embodiment of the invention, the input frame rate is 7.5 frames per second (FPS), and the output frame rate is 60 FPS.

The industry-standard exposure rate for fluoroscopy examinations at a low dose is 7.5 FPS. The frame rate of 60 FPS is an industry-standard refresh rate for monitor displays. Thus, to attain this upsampling ratio, eight uncorrelated noise reduction algorithms are applied to each input frame, to yield eight output frames with uncorrelated noise.

According to an embodiment of the invention, three, four, five, six, seven, eight, nine, ten, or more noise reduction algorithms with different parameter sets are applied.

Figure 6:
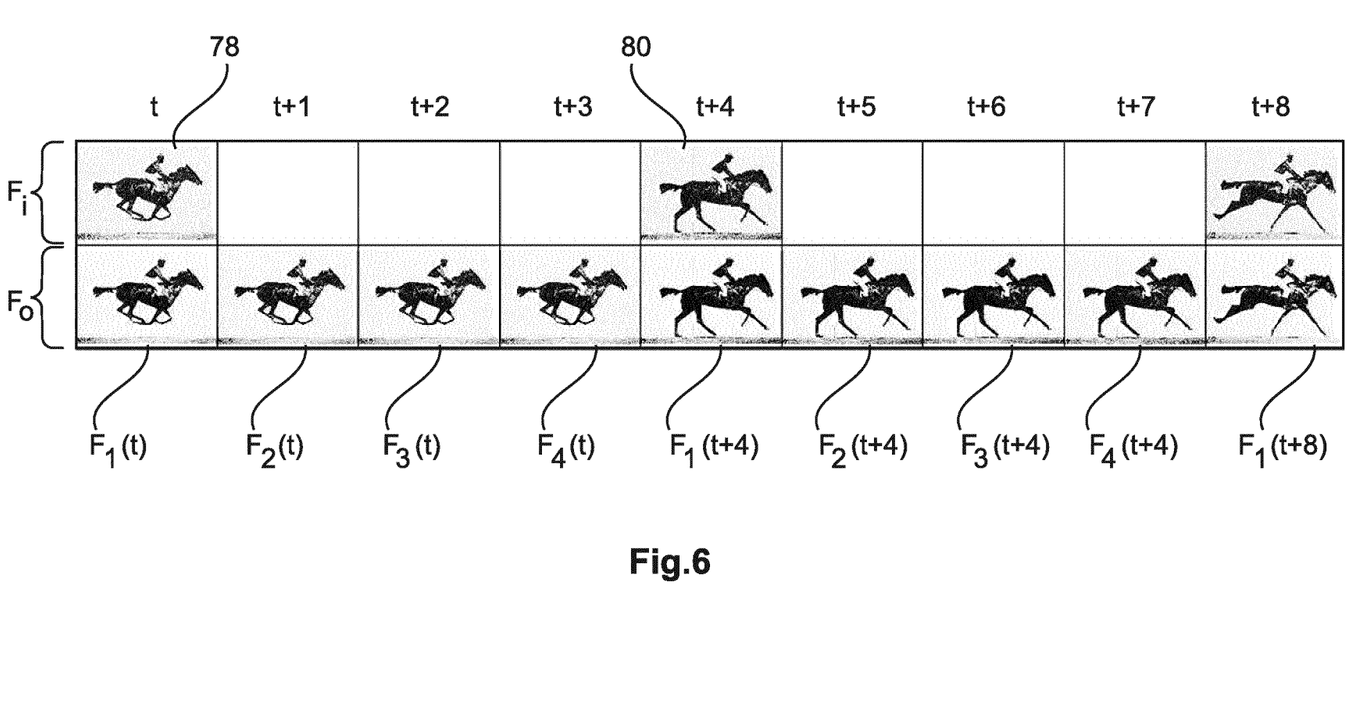
FIG. 6 illustrates a practical result of a method for medical image processing.

FIG. 6 illustrates an example of the algorithm in practice. A standard test sequence of a rider on a horse is shown in square 78. This is the first input frame of an input frame sequence $F_i$. Input frames are provided at t, t+4, and t+8. In the specific case illustrated in FIG. 6, the image processing algorithm is applied four times using four noise filtering algorithms, each with their own unique parameter set. Therefore, the first noise filtering algorithm output is shown at $F_1(t)$. The second denoised image is shown at $F_2(t)$. The third denoised image is shown at $F_3(t)$. The fourth denoised image is shown at $F_4(t)$. With the next frame of the sequence at 80, the algorithm repeats on the subsequent input frame provided at t+4.

Therefore, it can be seen that in relation to the input frame sequence, $F_i$, the input frame sequence frame rate is one quarter of the frame rate of the output frame sequence $F_o$. Owing to the use of different noise filtering algorithms on each image, the noise in images $F_1(t)$, $F_2(t)$, $F_3(t)$, and $F_4(t)$ will be uncorrelated.

The use of the term "input frame rate" and "output frame rate" does not limit the invention to a situation where the input frame image is acquired at a regular acquisition rate only. For example, in embodiments of the invention, input frame acquisition can be triggered according to a measured heart phase, for example. This may lead to a slight irregularity in the input rate of the input frame sequence. However, the effect of the invention is still achievable in this situation, because display of images at a greater average rate than an average acquisition rate is possible.

Therefore, according to an embodiment of the invention, an irregularity in the input frame sequence compared to a desired output frame rate is detected, and the application of at least one of the first or the second noise filtering algorithms to an input frame may be omitted or duplicated, to pad the output frame sequence with an extra denoised frame. This padding process is repeated until the desired output frame rate has been achieved.

An irregularity in the input frame sequence can arise, owing to accidental triggering of the fluoroscopy apparatus when the apparatus is being triggered by a heart or breathing impulse. An irregularity could also arise due to heart arrhythmia in a patient, as well. According to this embodiment, the irregularity in the input frame sequence can be addressed using a duplicated frame, which uses uncorrelated noise.

According to an embodiment of the invention, a method is provided as described above, wherein the first and/or second parameter sets comprise parameters defining an adaptive filter kernel in a spatial domain, and/or in a frequency domain.

According to an embodiment of the invention, a method is provided as described above, wherein a broad filter kernel is applied to a low frequency band, and a narrow filter kernel is applied to a high frequency band.

The frequency response of a noise smoothing filter (applicable as a noise filtering algorithm) can be discussed conveniently within a framework wherein discussed in FIG. 2. Of course, in a real application, the axis (if defining a spatial frequency domain) would run from zero to a number of line pairs per mm, for example. In designing a filter kernel, there is a wide choice of 2D matrices that could be employed. Any matrix composition numerically smaller than, or equal to, the size of the image could be applied. Commonly, the filter kernels are sized to be rather small compared to the overall image.

According to an embodiment of the invention, a method is provided as described above, wherein the second noise filtering algorithm is a temporal filter applied to an input frame sequence.

Therefore, a second noise filtering algorithm is provided whose task is to identify patches within an image stack that do not change significantly as a function of time. Such patches could be slow objects or background sections. A broad range of variables may be used to distinguish significant from insignificant information. Some examples for suitable variables include the entropy, the standard deviation, or the range of the pixel values inside an image patch which is a region of interest. For all of these possible variables, a threshold curve can be determined which adjusts the filter strength of the second noise filtering algorithm to suit the information content of the relevant "current" input frame.

Furthermore, the information assessment and filtering can be performed in different mathematical domains. For example, the spatial domain, the frequency domain or another domain.

According to an embodiment of the invention, a method is provided as described above, wherein the second parameter set further comprises parameters defining a temporal filter selected from the group of: filter bandwidth, entropy, geometrical feature translation between subsequent or past frames, and/or a temporal decay parameter between subsequent or past frames.

Therefore, a wide range of parameters may be used to ensure that output image frames have an maximally uncorrelated noise characteristic, or close to a maximally uncorrelated noise characteristic. In addition, filter parameters may be chosen to select specific clinical situations of acquisition modalities. A distinction can be seen between the cases of guidewire acquisition in a fluoroscopy image, as opposed to another case, organ display in an ultrasound image. Therefore, careful design of the parameter sets can enable the algorithm to be tuned to improve individual acquisition conditions.

According to an embodiment of the invention, a method is provided wherein a parameter in the first parameter set and/or the second parameter set is seeded with a random number.

The random character of residual image noise is most visible in the case of iterative denoising, processing, and reconstruction. Different starting solutions, priors, or weights applied to the algorithm will lead to significantly different results in terms of the spatial distribution of residual noise.

According to an embodiment of the invention, each of the processing parameters is assigned to a random number within an interval that is determined by the width of the filtering plateau, i.e. the area of constant attenuation 38.

The effect of this is that the noise filtering is rendered as being slightly non-deterministic.

According to an embodiment of the invention, a method is provided as described previously, wherein the order of application of the first noise filtering algorithm and the second noise filtering algorithm is varied for each new input frame in the input frame sequence.

According to an embodiment of the invention, a method is provided as described previously, wherein the order of application of at least the first and second denoising algorithms to a first image in the input image sequence is different to the order of application of at least the first and second denoising algorithms to a second image in the input image sequence.

According to an embodiment of the invention, a method is provided as described previously, wherein the order of application of at least the first and second denoising algorithms to the input image sequence is defined by a permutation function and/or a frame interleaver.

In an example of this embodiment, a random code generator, or pseudo-noise generator, such as a PN sequence generator, or a Gold sequence generator, is used to define the order of application of various denoising algorithms generated by at least the first and the second noise filtering algorithms. In other words, for a first input image, and its successor, the denoising algorithms will be applied to the first input image in a different order, compared to the order that the algorithms are applied to the second (successor) input image.

Certain categories of noise filtering algorithms may lead to similar categories of visual artefact being imposed on an output frame sequence. When these artefacts occur in a regular pattern in an output frame sequence by being applied to an input frame sequence repeatedly in the same order, such artefact sequences may appear to the user. The application of a PN sequence to permute the order of display of frames in an output frame sequence, wherein each frame has resulted from a different noise filtering algorithm, reduces the impact of such algorithm-specific artefacts.

According to an embodiment of the invention, a method is provided as defined above, comprising the further steps of:
a1) providing a medical image archive comprising medical images;
a2) using as the received input image an image from the medical image archive; and
e) generating a post-processed medical image archive comprising the first denoised image and the second denoised image.

According to this embodiment of the invention, the beneficial effect of averaging by the human visual system may be provided in images residing in medical archives held on a hard drive, a server, the internet, or a cloud server, CD-ROM archives, DVD archives, tape archives, and other data storage methods.

Therefore, historical images may also benefit from the image processing technique according to aspects of the invention.

Figure 7:
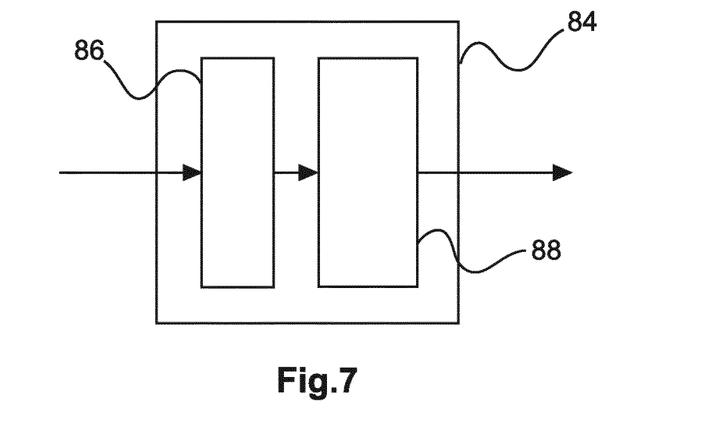
FIG. 7 illustrates a device for medical imaging processing according to a first aspect of the invention.

According to an aspect of the invention, a device for medical image processing 84 is provided. The device comprises an input unit 86, and a processing unit 88.

The input unit 86 is configured to receive an input image.

The processing unit 88 is configured to generate a first denoised image from the input image using a first noise filtering algorithm, wherein the first noise filtering algorithm is defined by a first parameter set, to generate a second denoised image from the input image using a second noise filtering algorithm, wherein the second noise filtering algorithm is defined by a second parameter set different to the first parameter set, and wherein a spatial distribution of residual noise in the first denoised image is different to a spatial distribution of residual noise in the second denoised image, thereby enabling a reduction in perceived residual noise when the first denoised image and the second denoised image are presented in sequence.

According to an embodiment of the invention, the device 84 is provided as described previously, wherein the first noise filtering algorithm is a spatial filter.

According to an embodiment of the invention, the device 84 is provided as described previously, wherein the input image is a static image, and wherein the first denoised image and the second denoised image are generated in a continuous loop.

According to an embodiment of the invention, the device 84 is provided as described previously, wherein the input image is comprised in an input frame sequence having an input frame rate, and wherein the processing unit is further configured to generate an output frame sequence having an output frame rate. The output frame sequence comprises the first denoised image and the second denoised image.

According to an embodiment of the invention, the device 84 is provided as described previously, wherein the first and/or second parameter sets comprise parameters defining a filter kernel in a spatial domain, and/or in a frequency domain.

According to an embodiment of the invention, the device 84 is provided as described previously, wherein the second noise filtering algorithm is a temporal filter applied to the input image and the input frame sequence.

According to an embodiment of the invention, the device 84 is provided as described previously, wherein the second parameter set further comprises parameters defining a temporal filter selected from the group of: filter bandwidth, entropy, geometrical feature translation between subsequent or past frames, and/or a temporal decay parameter between subsequent or past frames.

According to an embodiment of the invention, the device 84 is provided as described previously, wherein a parameter in the first parameter set and/or the second parameter set is seeded with a random number.

According to an embodiment of the invention, the device 84 is provided as described previously, wherein the order of application of the first noise filtering algorithm and the second noise filtering algorithm is varied for each new input frame in the input frame sequence.

According to an embodiment of the invention, the device 84 is provided as described previously, wherein the order of output of at least the first and second denoised image frames in the output image sequence is defined by a permutation function and/or a frame interleaver.

According to an embodiment of the invention, the device 84 is provided as described previously, wherein the input unit 86 is further configured to provide a medical image archive comprising medical images, and to use as the received input image an image from the medical image archive, and wherein the processing unit 88 is further configured to generate a post-processed medical image archive comprising the first denoised image and the second denoised image.

According to an embodiment of the invention, a device 84 is provided as described previously, wherein the order of application of at least the first and second denoising algorithms to a first image in the input image sequence is different to the order of application of at least the first and second denoising algorithms to a second image in the input image sequence.

Figure 8:
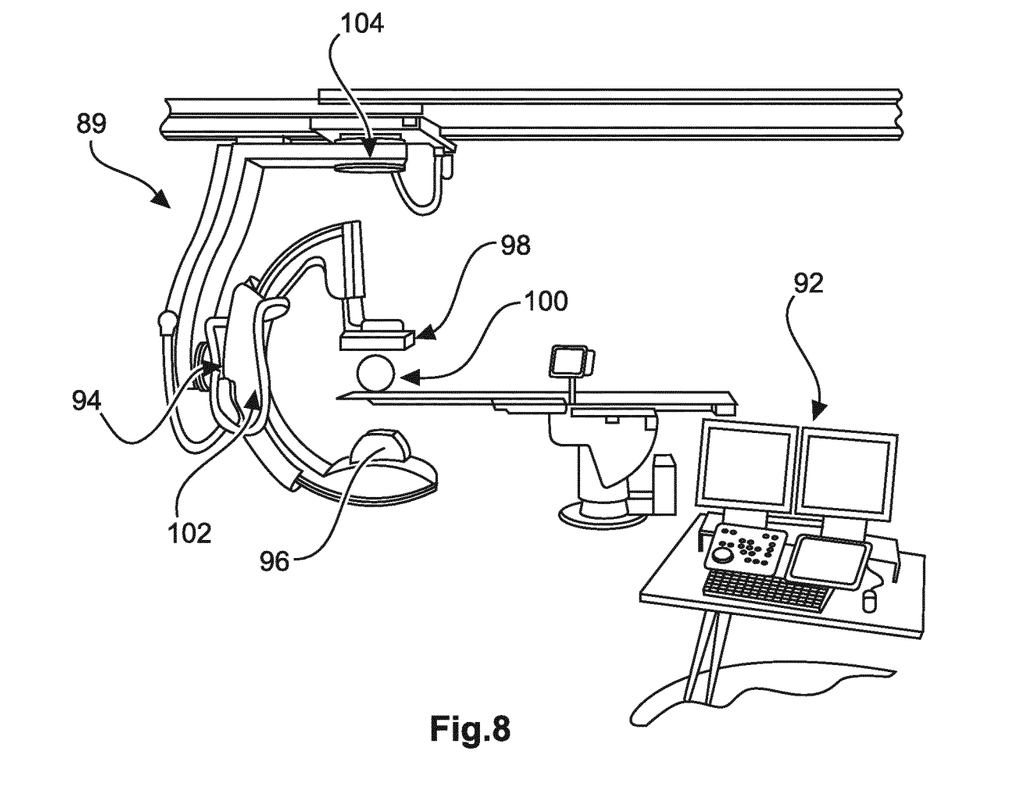
FIG. 8 illustrates a system for medical imaging according to a third aspect of the invention.

According to an aspect of the invention, a medical imaging system 89 is provided. The medical imaging system 89 comprises:

a medical imaging acquisition arrangement 90, and
a device for medical image processing 92.

The device for medical image processing is provided as a device as described previously.

FIG. 8 illustrates a medical imaging system according to an aspect of the invention. The medical imaging system 89 comprises a C-arm 94. The C-arm comprises an X-ray transmitter 96 and detector 98 arranged to image an object of interest 100. The C-arm 94 is electronically positionable around a target of interest 100 using servomotors 102 and 104.

Although aspects of the invention have been discussed primarily in terms of a fluoroscopic imaging system, the invention is generally applicable to all medical imaging modalities where residual image noise is a concern. Therefore, according to an embodiment of the invention, the medical imaging acquisition arrangement is a Computed Tomography (CT) scanner.

According to an embodiment of the invention, the medical imaging acquisition arrangement is a phase-contrast X-ray scanner.

According to an embodiment of the invention, the medical imaging acquisition arrangement is a digital X-ray machine.

According to an embodiment of the invention, the medical imaging acquisition arrangement is an ultrasound system.

According to an embodiment of the invention, the medical imaging acquisition arrangement is a Magnetic Resonance Imaging (MRI) scanner.

According to an aspect of the invention, a computer program element is provided for controlling a device for medical image processing as previously described, which, when being executed by a processing unit, is adapted to perform the method steps as previously described.

According to an aspect of the invention, a computer-readable medium having stored the program element previously described is provided.

A computer program element might be stored on a computer unit which could also be an embodiment of the invention. The computing unit may be adapted to perform or induce performance of the steps of the method described above. Moreover, it may be adapted to operate the components of the above-described apparatus. The computing unit can be adapted to operate automatically and/or to execute the orders of a user. A computer program may be loaded into a working memory or data processor. The data processor may thus be equipped to carry out the method of the invention. The computing unit can be supplemented with a high intensity processing unit such as a graphics card, or an FPGA expansion card, to perform computationally intensive operations.

This exemplary embodiment of the invention covers both the computer program that has the invention installed from the beginning, and a computer program that by means of an update turns an existing program into a program that uses the invention.

A computer program may be stored and/or distributed on a suitable medium, such as optical storage media or a solid state medium supplied together with, or as part of other hardware, but may also be distributed in other forms, such as via the Internet, or other wired or wireless telecommunication systems.

The computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It should to be noted that embodiments of the invention are described with reference to different subject-matters. In particular, some embodiments are described with reference to method-type claims, whereas other embodiments are described with reference to the device-type claims. A person skilled in the art will gather from the above, and the following description that, unless otherwise notified, in addition to any combination of features belonging to one type of subject-matter, also any other combination between features relating to different subject-matters is considered to be disclosed with this application.

All features can be combined to provide a synergetic effect that is more than the simple summation of the features.

While the invention has been illustrated and described in detail in the drawings and foregoing description, such illustration and description are to be considered illustrative or exemplary, and not restrictive. The invention is not limited to the disclosed embodiments.

In the claims, the word "comprising" does not exclude other elements or steps, and the indefinite article "a" or "an" does not exclude a plurality. A single processor, or other unit, may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A medical image processing device, comprising:
   an input unit configured to receive an input image;
   a processing unit configured to generate a first filtered image from the input image using a first noise filtering algorithm defined by a first parameter set, the processing unit being further configured to generate a second filtered image from the input image using a second noise filtering algorithm defined by a second parameter set different than the first parameter set, the first and second parameter sets being configured in such a way that a spatial distribution of residual noise in the first and second filtered images is uncorrelated, and wherein both the first and second noise filtering algorithms are either a spatial filter or a temporal filter; and
   an output unit configured for displaying the first and second filtered images sequentially to provide a perceived reduction in the residual noise displayed on the output unit.

2. The device according to claim 1, wherein the input image is a static image; and wherein the first and second filtered images are generated in a continuous loop.

3. The device according to claim 1, wherein the input image is included in an input frame sequence having an input frame rate; wherein the processing unit is further configured to generate an output frame sequence having an output frame rate higher than than input frame rate; and wherein the output frame sequence comprises the first and second filtered images.

4. The device according to claim 1, wherein the first and second parameter sets further comprise parameters defining a filter selected from: filter bandwidth, entropy, geometrical feature translation between subsequent or past frames, and/or a temporal decay parameter between subsequent or past frames.

5. The device according to claim 1, wherein an order of displaying at least the first and the second filtered images after application of at least the first and the second filtering algorithms to a first image in the input image sequence is different from the order of displaying at least the first and the second filtered images after application of at least the first and second filtering algorithms to a second image in the input image sequence.

6. The device according to claim 1, further comprising a first archive for storing medical images, wherein the input unit is configured to use as the input image an image from the medical image archive; and wherein the processing unit is further configured to generate a second archive comprising the first and second filtered images.

7. A medical imaging system, comprising:
   a medical imaging acquisition device; and
   a medical image processing device, comprising:
      an input unit configured to receive an input image;
      a processing unit configured to generate a first filtered image from the input image using a first noise filtering algorithm defined by a first parameter set, the processing unit being further configured to generate a second filtered image from the input image using a second noise filtering algorithm defined by a second parameter set different than the first parameter set, the first and second parameter sets being configured in such a way that a spatial distribution of residual noise in the first and second filtered images is uncorrelated, and wherein both the first and second noise filtering algorithms are either a spatial filter or a temporal filter; and
      an output unit configured for displaying the first and second filtered images sequentially to provide a perceived reduction in the residual noise as displayed on the output unit.

8. A method for medical image processing, comprising:
   receiving an input image;
   generating a first filtered image from the input image using a first noise filtering algorithm defined by a first parameter set;
   generating a second filtered image from the input image using a second noise filtering algorithm defined by a second parameter set different than the first parameter set; and
   displaying the first and second filtered images sequentially to provide a perceived reduction in the residual noise on a display, wherein the first and second parameter sets are configured in such a way that a spatial distribution of residual noise in the first and second filtered images is uncorrelated, and wherein both the first and second noise filtering algorithms are either a spatial filter or a temporal filter.

9. The method according to claim 8, further comprising including the input image in an input frame sequence having an input frame rate; and generating an output frame sequence having an output frame rate higher than than input frame rate; wherein the output frame sequence comprises the first and second filtered images.

10. The method according to claim 8, further comprising:
    providing a medical image archive for storing medical images;
    using as the received input image an image from the medical image archive; and
    generating a post-processed medical image archive comprising the first and second filtered images.

11. A non-transitory computer-readable medium having one or more executable instructions stored thereon, which, when executed by a processor, cause the processor to perform a method for processing medical images, the method comprising:
    receiving an input image;
    generating a first filtered image from the input image using a first noise filtering algorithm defined by a first parameter set;
    generating a second filtered image from the input image using a second noise filtering algorithm defined by a second parameter set different than the first parameter set; and
    displaying the first and second filtered images sequentially to provide a perceived reduction in the residual noise on a display, wherein the first and second parameter sets are configured in such a way that a spatial distribution of residual noise in the first and second filtered images is uncorrelated, and wherein both the first and second noise filtering algorithms are either a spatial filter or a temporal filter.

* * * * *